US008402277B2

(12) United States Patent
Wang et al.

(10) Patent No.: US 8,402,277 B2
(45) Date of Patent: Mar. 19, 2013

(54) SECURE MAILBOX PRINTING SYSTEM WITH AUTHENTICATION ON BOTH HOST AND DEVICE (75) Inventors: Lida Wang, Concord, CA (US); Hiromasa Akamatsu, Pleasant Hill, CA (US); Yuichi Komori, Pleasant Hill, CA (US); Takeshi Nakamura, Torrance, CA (US); Toshitsugu Nishimi, Tokyo (JP); Masayuki Orita, Torrance, CA (US)

(73) Assignees: KYOCERA Document Solutions Inc., Osaka (JP); KYOCERA Document Solutions Development America, Inc., Concord, CA (US)

( * ) Notice: Subject to any disclaimer, the term of this patent is extended or adjusted under 35 U.S.C. 154(b) by 1453 days.

(21) Appl. No.: 11/519,724

(22) Filed: Sep. 12, 2006

(65) Prior Publication Data
US 2008/0065894 A1 Mar. 13, 2008

(51) Int. Cl.
*G06F 21/00* (2006.01)

(52) U.S. Cl. ........... 713/178; 726/5; 726/22; 726/26; 380/277; 380/278; 713/176; 709/204; 455/411; 705/74

(58) Field of Classification Search ............ 713/171, 713/176, 178
See application file for complete search history.

(56) References Cited

U.S. PATENT DOCUMENTS

| 5,434,918 | A * | 7/1995 | Kung et al. ............ 713/169 |
|---|---|---|---|
| 6,711,677 | B1 | 3/2004 | Wiegley |
| 6,795,205 | B1 | 9/2004 | Gacek |
| 6,801,935 | B2 | 10/2004 | Shen |
| 6,862,583 | B1 | 3/2005 | Mazzagatte |
| 7,003,667 | B1 * | 2/2006 | Slick et al. ............ 713/182 |
| 7,111,322 | B2 * | 9/2006 | Slick et al. ............ 726/5 |
| 7,218,406 | B2 * | 5/2007 | Al-Kazily et al. ............ 358/1.15 |
| 7,284,061 | B2 * | 10/2007 | Matsubayashi et al. ...... 709/229 |
| 2002/0051174 | A1 * | 5/2002 | Betts et al. ............ 358/1.15 |
| 2002/0083114 | A1 * | 6/2002 | Mazzagatte et al. ......... 709/100 |
| 2003/0112464 | A1 * | 6/2003 | Garcia et al. ............ 358/1.15 |
| 2003/0187951 | A1 * | 10/2003 | Shen ............ 709/219 |
| 2005/0052699 | A1 | 3/2005 | Goicoechea |
| 2005/0097335 | A1 | 5/2005 | Shenoy |
| 2005/0097347 | A1 * | 5/2005 | Josephsen et al. ............ 713/200 |
| 2005/0154884 | A1 * | 7/2005 | Van Den Tillaart ........... 713/165 |
| 2005/0197967 | A1 | 9/2005 | Booth |
| 2005/0200885 | A1 * | 9/2005 | Nishizawa et al. ........... 358/1.15 |
| 2005/0262340 | A1 * | 11/2005 | Rabb ............ 713/165 |
| 2005/0270567 | A1 | 12/2005 | Du |

(Continued)

OTHER PUBLICATIONS

Smetters et al., "Domain-Based Administration of Identity-Based Cryptosystems for Secure Email and IPSEC", 12th USENIX Security Symposium—Technical Paper, Security '03 Paper.*

*Primary Examiner* — Morshed Mehedi (57) ABSTRACT

A method for secure communication and printing, comprising: user entering user and destination information to host; authentication server producing, saving encryption key for the job, user, and destination information into database, and sending to host; host encrypting the job using encryption key and sending job to destination; user entering user and destination information to device; authentication server retrieving encryption key from database, and sending to device; and device decrypting the job using encryption key and releasing job. Authentication at both host and MFP sides disables unauthorized, malicious attack to a user's mailbox, and results in jobs to a mailbox having different dynamic encryption keys, and no password or mailbox PIN trafficking on network. Furthermore, host and MFP can be at different domains. Methods also include secrecy encrypting encryption key; hashing key generator using SHA1, MD5, etc.; password, PIN, RFID, biometrics; and timer module deleting jobs older than threshold value from storage.

20 Claims, 6 Drawing Sheets

U.S. PATENT DOCUMENTS

| | | |
|---|---|---|
| 2005/0273843 A1* | 12/2005 | Shigeeda ............................ 726/5 |
| 2005/0275866 A1 | 12/2005 | Corlett |
| 2006/0064738 A1* | 3/2006 | Hino et al. ......................... 726/2 |
| 2006/0079206 A1* | 4/2006 | Kim ............................... 455/411 |
| 2007/0022467 A1* | 1/2007 | Filbrich ............................ 726/2 |
| 2007/0078782 A1* | 4/2007 | Ono et al. ......................... 705/67 |
| 2007/0115494 A1* | 5/2007 | Nakayama .................... 358/1.14 |
| 2007/0133033 A1* | 6/2007 | Mizutani et al. .............. 358/1.14 |

* cited by examiner

430 Printer Driver
or MFP (printing device)

The secrecy is decrypted to obtain the encryption key by running the same key generator used by the authentication server.

(Only when the job, destination and user ID as well as his credential information are the same as those used by authentication server key generator can the host decrypt the secrecy.)

410
Authentication server

Creates secrecy from the encryption key by running a key generator on job, destination and user ID as well as his credential information stored in the authentication server (Key generator uses hash algorithm such as SHA1, MD5, etc.)

420
Secrecy back to Printer Driver or MFP

SECURE MAILBOX PRINTING SYSTEM WITH AUTHENTICATION ON BOTH HOST AND DEVICE

FIELD OF THE INVENTION

This invention relates to secure communication of a job to a device, and more particularly to a secure mailbox printing system with authentication on both host and device sides.

BACKGROUND OF THE INVENTION

When one intends to print a confidential document, it is undesirable for a random person in the office who happens to be walking by to see the document or a coworker to pick up and carry away the document by mistake. One way to avoid this undesirable situation is to require that identification information is entered into a printing device or an MFP. This identification information needs to be authenticated using a password or other means of identification. However, existing solutions regarding identification, authentication, and secure communication do not address the problem of a malicious attack by sending a large amount of print jobs to a mailbox to which the malicious sender has no authorization. Also unsolved is the problem of an interceptor of a print job analyzing the intercepted print job to obtain the decryption key and using the decryption key to read the other jobs from the same originating user. The present invention arose out of the above perceived needs and concerns associated with secure communication of printing jobs involving destination mailboxes.

SUMMARY OF THE INVENTION

Methods, computer program products, computing and printing systems for secure communication of a job to a device, and more particularly to a secure mailbox printing system with authentication on both host and device sides, are described.

The following effects and results are achieved by the present invention. Authentications at both host side and MFP side are performed so that user A can not pretend to be another user B and send print job to user B's user account that he is not authorized in MFP's hard disk. This solves the problem of a malicious attack by sending a large amount of print jobs to a mailbox (or mail box) to which the malicious sender has no authorization.

In another aspect of the present invention, by performing authentication at both sides, a dynamic encryption key will be produced to encrypt documents even if all these documents are printed to the same mailbox. This solves the problem of an interceptor of a print job analyzing the intercepted print job to obtain the decryption key and using the decryption key to read the other jobs from the same originating user.

In further aspects of the present invention, by performing authentication at both sides, no password or mailbox PIN (including an encrypted one) traffics on the network, and the host computer that releases the print job can sit in a different domain with the MFP which actually released the job.

The invention will be more fully understood upon consideration of the detailed description below, taken together with the accompanying drawings.

DETAILED DESCRIPTION OF THE INVENTION

In the following detailed description, numerous specific details are set forth in order to provide a thorough understanding of the present invention. However, it will be apparent to one of ordinary skill in the art that these specific details need not be used to practice the present invention. In other instances, well known structures, interfaces, and processes have not been shown in detail in order not to unnecessarily obscure the present invention.

Figure 1:
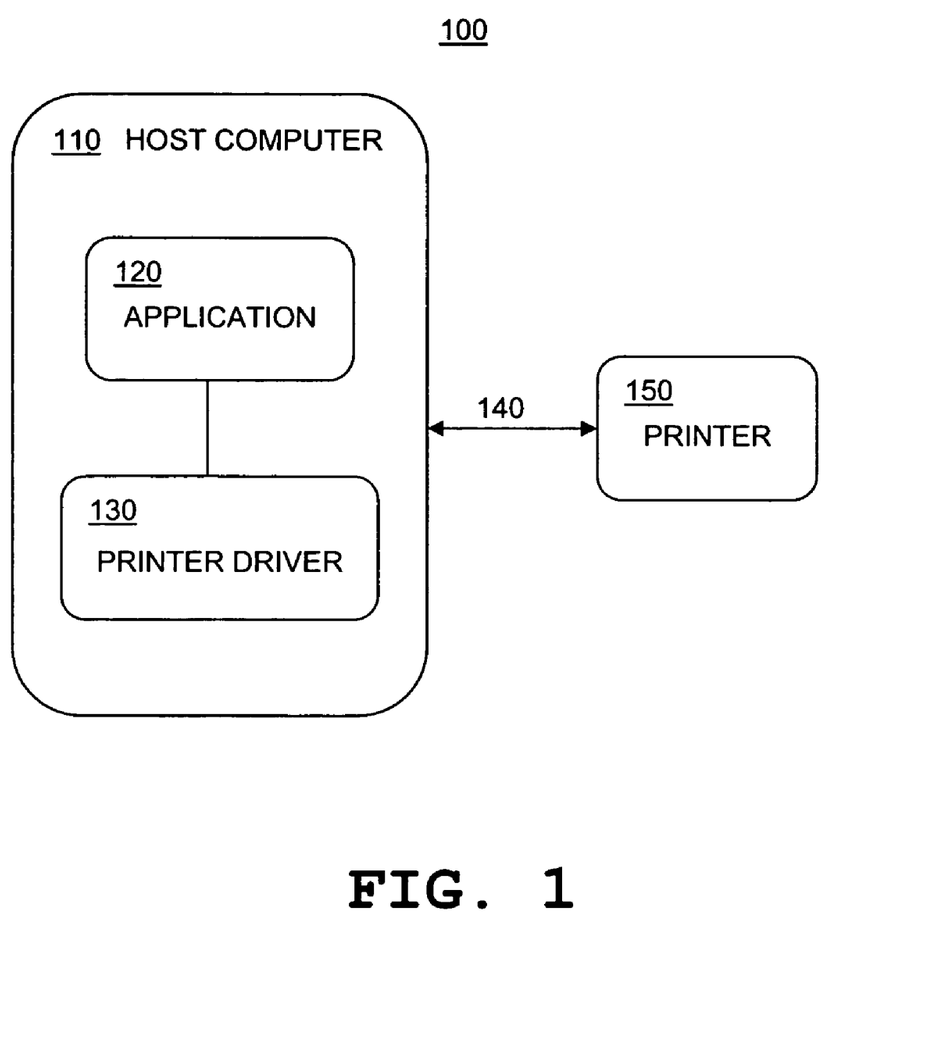
FIG. 1 is a simplified block diagram showing connection of a computing system to a printer, in accordance with a preferred embodiment of the present invention.

FIG. 1 is a simplified block diagram showing connection of a computing system to a printer, in accordance with a preferred embodiment of the present invention. FIG. 1 shows a general printing system setup 100 that includes a host computer 110 and a printer 150. Here, the printer 150 may be any device that can act as a printer, e.g. an inkjet printer, a laser printer, a photo printer, or an MFP (Multifunction Peripheral or Multi-Functional Peripheral) that may incorporate additional functions such as faxing, facsimile transmission, scanning, and copying.

The host computer 110 includes an application 120 and a printer driver 130. The application 120 refers to any computer program that is capable of issuing any type of request, either directly or indirectly, to print information. Examples of an application include, but are not limited to, commonly used programs such as word processors, spreadsheets, browsers and imaging programs. Since the invention is not platform or machine specific, other examples of application 120 include any program written for any device, including personal computers, network appliance, handheld computer, personal digital assistant, handheld or multimedia devices that is capable of printing.

The printer driver 130 is a software interfacing with the application 120 and the printer 150. Printer drivers are generally known. They enable a processor, such as a personal computer, to configure an output data from an application that will be recognized and acted upon by a connected printer. The output data stream implements necessary synchronizing actions required to enable interaction between the processor and the connected printer. For a processor, such as a personal computer, to operate correctly, it requires an operating system such as DOS (Disk Operating System) Windows, Unix, Linux, Palm OS, or Apple OS.

A printer I/O (Input/Output) interface connection 140 is provided and permits host computer 110 to communicate with a printer 150. Printer 150 is configured to receive print commands from the host computer and, responsive thereto, render a printed media. Various exemplary printers include laser printers that are sold by the assignee of this invention. The connection 140 from the host computer 110 to the printer 150 may be a traditional printer cable through a parallel interface connection or any other method of connecting a computer to a printer used in the art, e.g., a serial interface connection, a remote network connection, a wireless connection, or an infrared connection. The varieties of processors, printing systems, and connection between them are well known.

The present invention is suited for printer drivers, and it is also suited for other device drivers. The above explanations regarding FIG. 1 used a printer driver rather than a general device driver for concreteness of the explanations, but they also apply to other device drivers. Similarly, the following descriptions of the preferred embodiments generally use examples pertaining to printer driver, but they are to be understood as similarly applicable to other kinds of device drivers.

This invention presents a secure mailbox printing method. This method ensures that one mailbox user can not fake his identity to print to other user's mailbox to which he is not authorized, thus MFP's hard disk is protected from being attacked and overflowed with. malicious user's garbage files. Moreover, the security is enforced by producing different encryption key even for those documents that will be printed into the same mailbox. By doing this, even if the administrator has not changed the mailbox PIN number frequently, security still will not be compromised. The above functions are accomplished through requiring the user to authenticate to the authentication server both when he wants to print a job and when he wants the MFP to release his job. Also host computer which prints the files can stay in different domains with MFP which actually releases the files.

Figure 2:
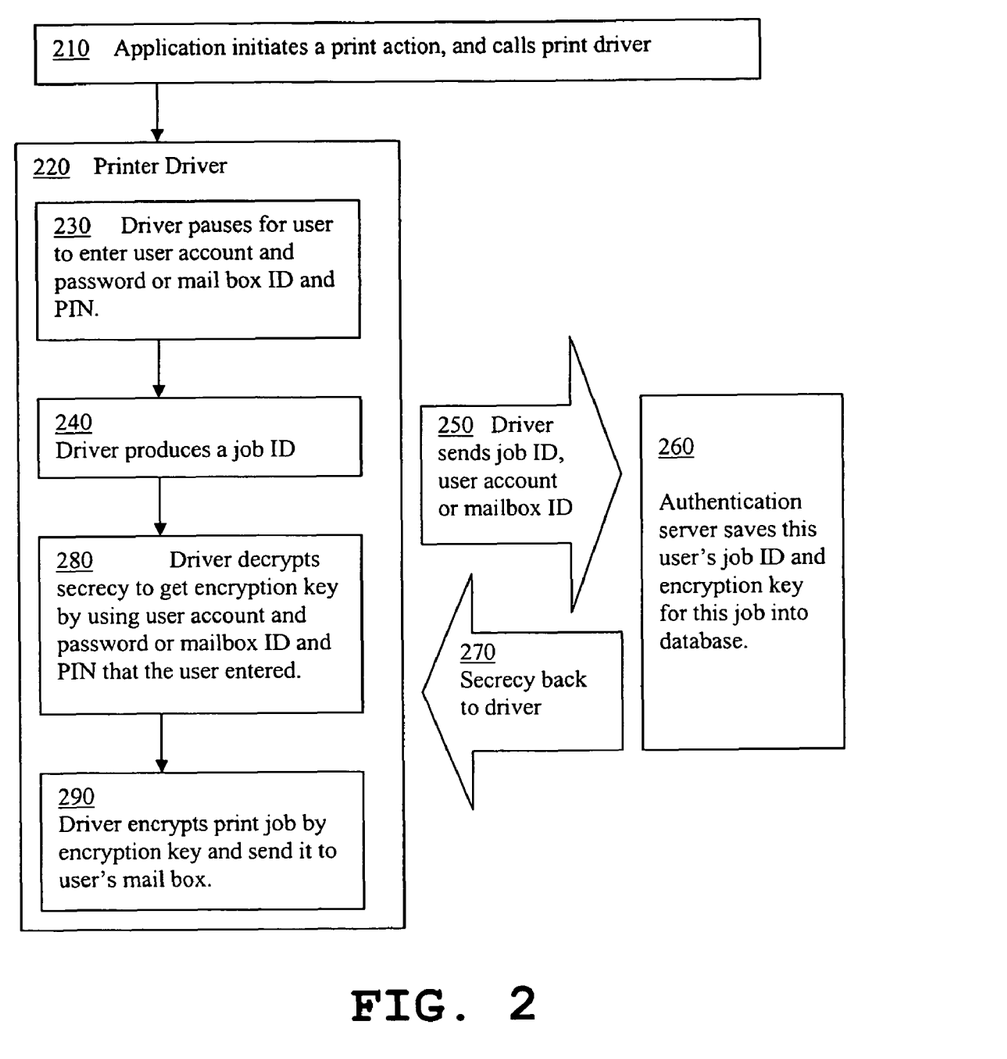
FIG. 2 is a block diagram and flowchart showing the processing steps for a job issuing procedure, in accordance with a preferred embodiment of the present invention.

FIG. 2 is a block diagram and flowchart showing the processing steps for a job issuing procedure, in accordance with a preferred embodiment of the present invention. The procedure of job issuing is illustrated in FIG. 2 as well as described as follows.

In Step 210, printing is initiated from an application, which calls a print driver or printer driver 220.

In Step 230, the printer driver pauses for user to enter user account information, password, mailbox ID, and PIN. Alternatively this information can be entered into an application: when user wants to print to a mailbox in a MFP, he first inputs his account and password or mailbox ID and PIN to the application which pauses for this information. By a user's mailbox or account in MFP, we mean a portion of space in MFP's hard disk used to store temporally or permanently a user's print job. Each mailbox is identified by a user's name and password.

In Step 240, the printer driver first produces a print job ID number, then in Step 250, the driver sends the job ID number and user account or mailbox ID to the authentication server. An authentication server is a server with a database that contains all user mailboxes' ID and its matching password. The authentication server, user and MFP can sit in different domains. Kerberos authentication server may also be included.

In Step 260, the authentication server then produces some secrecy that only the real user who possesses the correct password or PIN number of that can decrypt. Whether or not the mailbox printing procedure will continue to proceed depends on whether or not the secrecy from authentication server is decrypted successfully or not.

The authentication server produces a secrecy through the following procedure: First, authentication server queries from the database the corresponding PIN number or password stored based on the ID or user account name received. Secondly, authentication server runs some hash function such as SHA1 or MD5 on user ID and password to produce an encryption key. Finally, the authentication server uses this encryption key to encrypt a random number by using some encryption algorithm. This random number is the key used to encrypt the specified print job. The encrypted random number is the secrecy the authentication server sends back in Step 270. Authentication server also saves this user's job ID number and encryption key into database. The encryption and decryption procedures involve running some symmetric key encryption algorithm including RC4, AES, DES, etc.

In Step 280, the printer driver decrypts the secrecy to get the encryption key by using user account and password or mailbox ID and PIN that the user entered. Then in Step 290, once the authentication server's secrecy is successfully decrypted, user can use the decrypted random number to encrypt the document by some encryption algorithm and send it to the mailbox that user specified.

Figure 3:
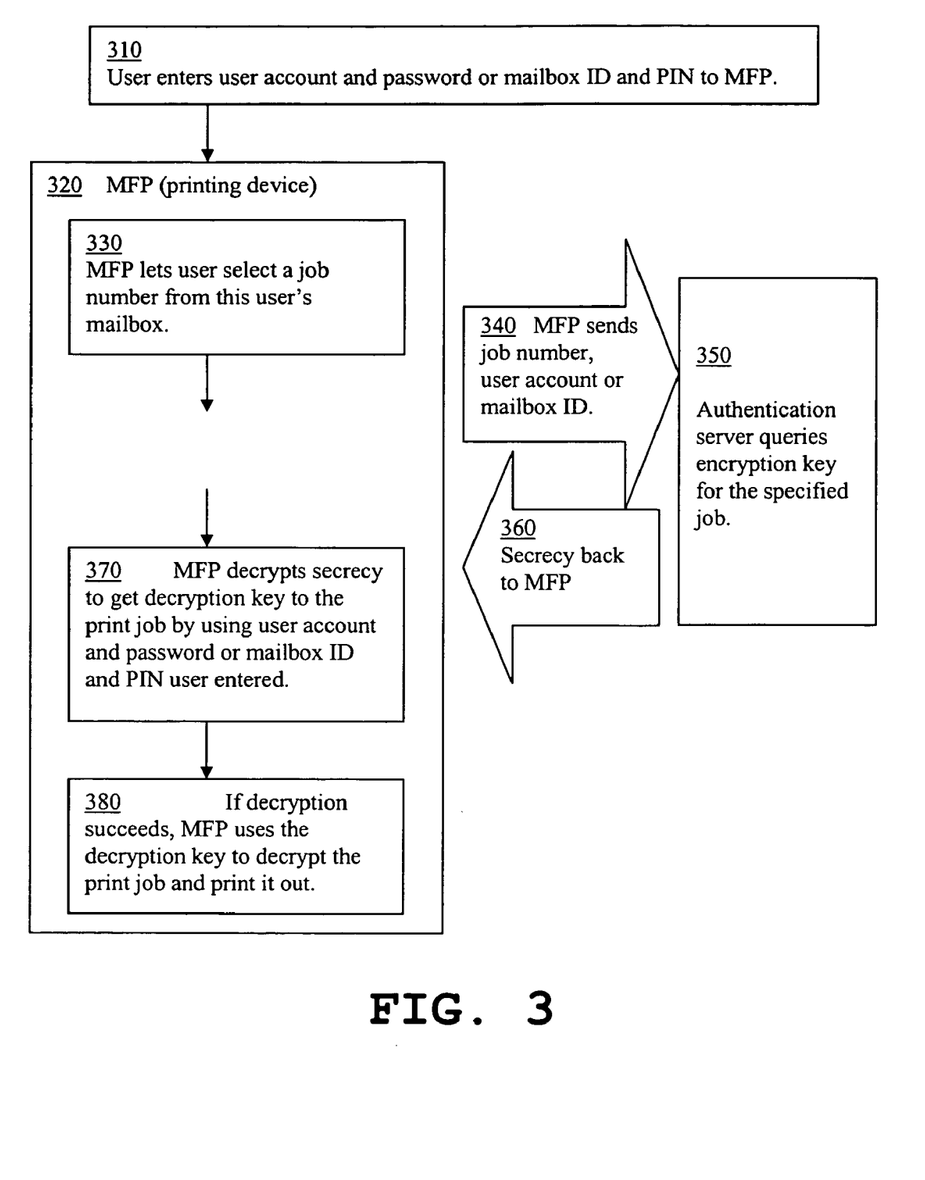
FIG. 3 is a block diagram and flowchart showing the processing steps for a procedure of an MFP's job releasing procedure, in accordance with a preferred embodiment of the present invention.

FIG. 3 is a block diagram and flowchart showing the processing steps for a procedure of an MFP's job releasing procedure, in accordance with a preferred embodiment of the present invention. Job releasing is in the similar procedure as in job issuing.

In Step 310, the user first enters his account and password or mailbox ID and PIN to the MFP or some printing device 320.

In Step 330, the MFP lets user select one job by selecting one job number from this user's mailbox.

In Step 340, the MFP authenticates the user to the authentication server by sending the job number user selected, user account or mailbox ID to the authentication server.

In Step 350 and 360, the authentication server queries the encryption key for the specified job by looking it up and retrieving it from the database, and then sends back a secrecy in which the decryption key to the document is included. This secrecy is calculated by the following procedure: First, authentication server fetches encryption key to the specified job based on user account and job number. Secondly authentication server fetches this user's password or PIN. Thirdly, the authentication server runs some hash function such MD5 or SHA1 on user's account and password to produce an encryption key. This encryption key is used to encrypt the encryption key to the print job. The encrypted encryption key to the print job is the secrecy the authentication server sends back.

In Step 370, the MFP decrypts the secrecy to get a decryption key to the print job by using user account and password or mailbox ID and PIN that the user entered. Only when the user present to the MFP the same password or PIN number as what is stored in the authentication server can the MFP decrypt the secrecy and use the decrypted encryption key included in the secrecy to decrypt the document and release the job successfully.

In Step 380, if the decryption succeeds, the MFP uses the decryption key to decrypt the print job and release it. Typically this causes the pages of the print job to be printed out.

Figure 4:
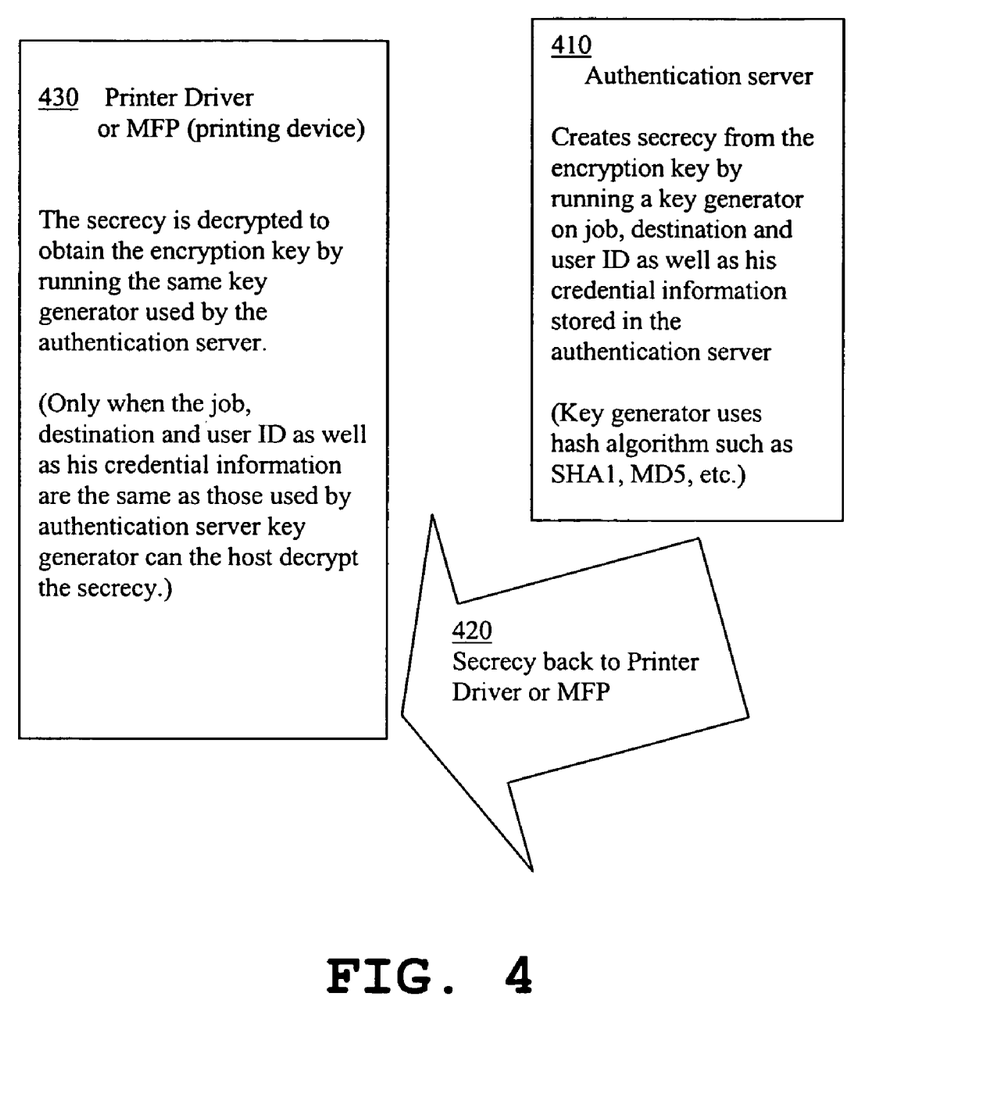
FIG. 4 is a block diagram showing the process of an authentication server sending a secrecy to a printer driver or MFP, in accordance with a preferred embodiment of the present invention.

FIG. 4 is a block diagram showing the process of an authentication server sending a secrecy to a printer driver or MFP, in accordance with a preferred embodiment of the present invention.

In Step 410, the authentication server creates a secrecy from the encryption key by running a key generator on the job, destination and user ID as well as his credential information stored in the authentication server. Here the key generator uses a hash algorithm such as SHA1, MD5, etc.

In Step 420, the created secrecy is sent back to the Printer Driver or MFP. The authentication server sends the created secrecy to a printer driver during the job-issuing process, and to an MFP during the job-releasing process. In either case, the basic handling procedure of the encrypting, sending, and decrypting of the secrecy is the same.

In Step 430, the Printer Driver or the MFP (printing device) decrypts the secrecy to obtain the encryption key by running the same key generator used by the authentication server. Only when the job, destination and user ID as well as his credential information are the same as those used by authentication server key generator can the host decrypt the secrecy.

Figure 5:
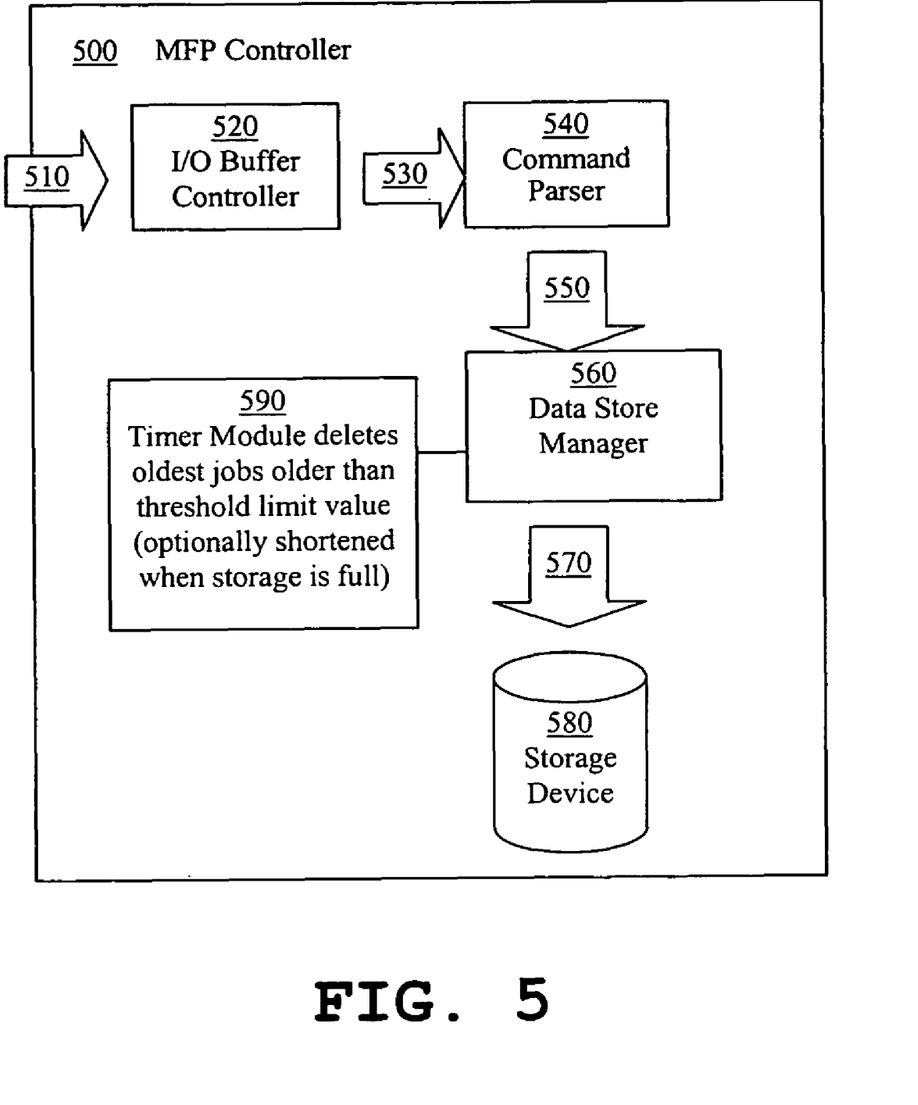
FIG. 5 is a block diagram showing the flow of data among components of an MFP controller including a Timer Module, in accordance with a preferred embodiment of the present invention.
Figure 6:
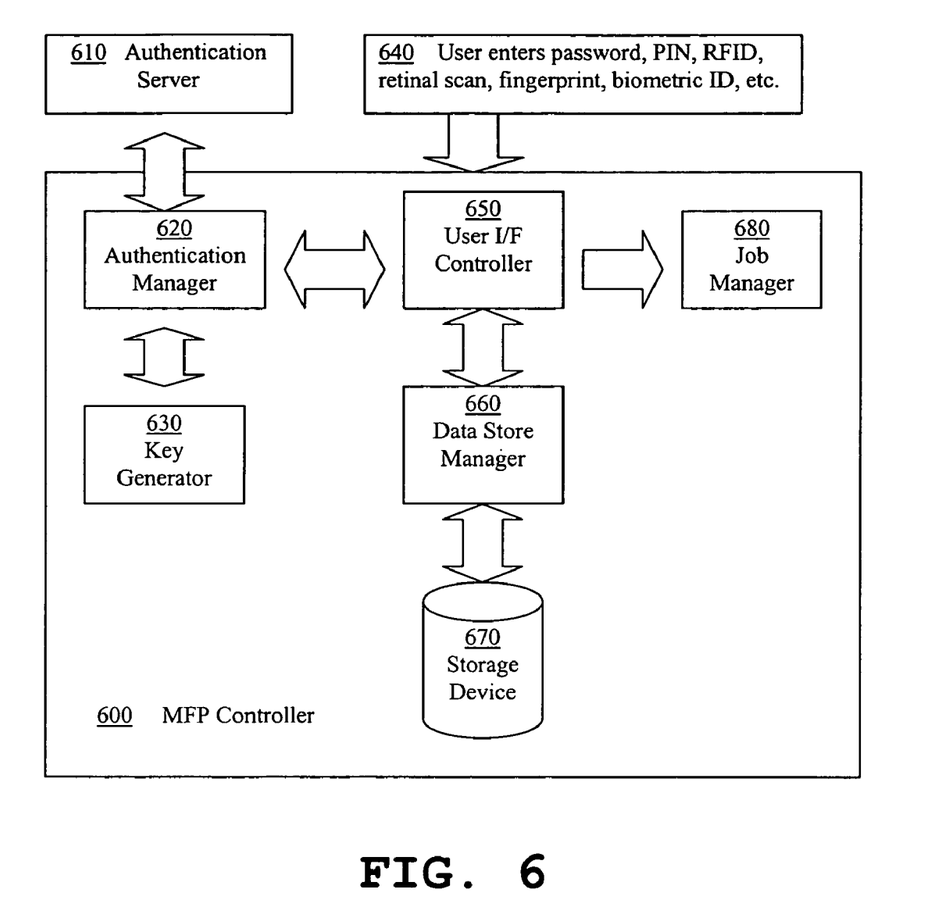
FIG. 6 is a block diagram showing the flow of data among components of an MFP controller including a Key Generator, in accordance with a preferred embodiment of the present invention.

FIG. 5 is a block diagram showing the flow of data among components of an MFP controller including a Timer Module, in accordance with a preferred embodiment of the present invention. FIG. 5 and FIG. 6 describe processing within the MFP during the job releasing procedure.

After the MFP 500 receives an encrypted printed job 510 from the host or elsewhere, the I/O buffer controller 510 receives the job and stores it temporarily in memory.

The command parser 540 checks the format of the job to make sure it is well-formed. By analyzing information attached to the encrypted job 530, the received job is recognized as a job that is subject to the processing of the present invention, and is determined to be processed for storing in the mailbox. The body message portion of the job is not yet decoded at this point.

Data store manager 560 timestamps the job, and prepares the job for storage in the mailbox in the storage device 580. The optional timer module 590 periodically checks the timestamps of the jobs, and according to the specified threshold value time limit, deletes jobs that have been kept in the mailbox for too long without being retrieved. In an embodiment of the present invention, a job is deleted if it is older than a threshold time limit value, where the threshold time limit value is optionally shortened if a storage capacity of the device exceeds a threshold capacity limit value. This prevents overflow of the mailbox storage space which can be caused by users forgetting to release jobs from the mailbox.

FIG. 6 is a block diagram showing the flow of data among components of an MFP controller including a Key Generator, in accordance with a preferred embodiment of the present invention. Following the processing described in reference to FIG. 5, at this point, the job is stored in the mailbox.

The user 640 enters user account and password or mailbox ID and PIN into the User I/F controller 650, which is responsible for the front panel and other user interface components of the MFP. In embodiments of the present invention, entering of user information may involve methods of entering password, PIN (personal identification number), RFID (radio frequency identification), retinal scan, fingerprint, biometric identification, and combinations thereof. User I/F controller 650 of the MFP retrieves job list from the data store manager, and lets the user manually select a job from a list of jobs in the mailbox.

Then the MFP sends job number user, user account or mailbox ID to the authentication server 610 through the authentication manager 620. The authentication server queries for an encryption key for the specified job, and the authentication server sends back secrecy to the authentication manager 620 of the MFP.

Using the secrecy and the user ID together with the password, a key is generated by the key generator 630 of the UP to decode the encrypted print job. This procedure has been described in reference to the earlier figures. Then the authentication manager sends back the decode key to User I/F Controller, and the user I/F controller asks the job manger 680 to create Printer Job with decode key.

Although this invention has been largely described using terminology pertaining to printer drivers, one skilled in this art could see how the disclosed methods can be used with other device drivers. The foregoing descriptions used printer drivers rather than general device drivers for concreteness of the explanations, but they also apply to other device drivers. Similarly, the foregoing descriptions of the preferred embodiments generally use examples pertaining to printer driver settings, but they are to be understood as similarly applicable to other kinds of device drivers.

Although the terminology and description of this invention may seem to have assumed a certain platform, one skilled in this art could see how the disclosed methods can be used with other operating systems, such as Windows, DOS, Unix, Linux, Palm OS, or Apple OS, and in a variety of devices, including personal computers, network appliance, handheld computer, personal digital assistant, handheld and multimedia devices, etc. One skilled in this art could also see how the user could be provided with more choices, or how the invention could be automated to make one or more of the steps in the methods of the invention invisible to the end user.

While this invention has been described in conjunction with its specific embodiments, it is evident that many alternatives, modifications and variations will be apparent to those skilled in the art. There are changes that may be made without departing from the spirit and scope of the invention.

Any element in a claim that does not explicitly state "means for" performing a specific function, or "step for" performing a specific function, is not to be interpreted as a "means" or "step" clause as specified in 35 U.S.C. 112, Paragraph 6. In particular, the use of "step(s) of" or "method step(s) of" in the claims herein is not intended to invoke the provisions of 35 U.S.C. 112, Paragraph 6.

What is claimed is:

1. A method for secure communication of a job to a device, comprising:

a user entering to a host user identification information and destination information;

the host sending the job, user, and destination information to an authentication server that contains a database containing all user mailbox ID and password information, wherein the authentication server, the user, and the device reside in a same or different domains;

the authentication server producing and saving a unique encrypted encryption key associated with the job, user, and destination information into the database;

the authentication server sending the encrypted encryption key information to the host so that only a user who possesses a correct user information decrypt and fetch an encryption key to proceed with secure mail box print procedure, preventing a malicious user from faking identity to print to the user's mailbox to which the malicious User is not authorized, overflowing the user's mailbox with the malicious user's garbage files;

the host encrypting the job using the encryption key and sending the encrypted job to a destination of the destination information;

the user entering to the device user identification information and destination information;

the device sending the job, user, and destination information to the authentication server;

the authentication server retrieving the encryption key associated with the job, user, and destination information from the database;

the authentication server sending the encryption key information to the device;

the device decrypting the job using the encryption key and releasing the job.

2. The method of claim 1, wherein the communication of a job to a device comprises communication of a print job to a printing device;

the user entering to the host user identification information and destination information comprises the user entering to a printer driver user identification information and destination mailbox information;

the destination of the destination information is a destination mailbox; and the device releasing the job comprises printing the print job.

3. The method of claim 1, wherein the authentication server sending the encryption key information to the host comprises the authentication server sending a secrecy encrypting the encryption key to the host;

the host encrypting the job using the encryption key comprises first decrypting the secrecy to obtain the encryption key;

the authentication server sending the encryption key information to the device comprises the authentication server sending a secrecy encrypting the encryption key to the device; and the device decrypting the job using the encryption key comprises first decrypting the secrecy to obtain the encryption key.

4. The method of claim 3, wherein the authentication server sending a secrecy encrypting the encryption key to the host and device comprises the authentication server running a key generator on job, destination, user identification, and user credential information stored in the authentication server to produce the secrecy.

5. The method of claim 4, wherein the running of the key generator on job, destination, user identification, and user credential information comprises use of a method selected from the group consisting of SHA1 and MD5 and combinations thereof on job, destination, user identification, and user credential information.

6. The method of claim 4, wherein the decrypting of the secrecy to obtain the encryption key comprises running same key generator as used by the authentication server on job, destination, user identification, and user credential information, and wherein decrypting of the secrecy succeeds only when job, destination, user identification, and user credential information used for decrypting is same as that used by the key generator of the authentication server.

7. The method of claim 1, wherein the user entering user identification information comprises use of a method selected from the group consisting of password, personal identification number, radio frequency identification, retinal scan, fingerprint, biometric identification and combinations thereof.

8. The method of claim 1, wherein a timer module of the device checks timestamp of a job and the job is deleted if the job is older than a threshold time limit value, where the threshold time limit value is optionally shortened if a storage capacity of the device exceeds a threshold capacity limit value.

9. A computer program product in a non-transitory computer-readable storage medium for secure communication of a job to a device, comprising machine-readable code for causing a machine to perform steps of:

a user entering to a host user identification information and destination information;

the host sending the job, user, and destination information to an authentication server that contains a database containing all user mailbox ID and password information, wherein the authentication server, the user, and the device reside in a same or different domains;

the authentication server producing and saving a unique encrypted encryption key associated with the job, user, and destination information into the database;

the authentication server sending the encrypted encryption key information to the host so that only a user who possesses a correct user information decrypt and fetch an encryption key to proceed with secure mail box print procedure, preventing a malicious user from faking identity to print to the user's mailbox to which the malicious user is not authorized, overflowing the user's mailbox with the malicious user's garbage files;

the host encrypting the job using the encryption key and sending the encrypted job to a destination of the destination information;

the user entering to the device user identification information and destination information;

the device sending the job, user, and destination information to the authentication server;

the authentication server retrieving the encryption key associated with the job, user, and destination information from the database;

the authentication server sending the encryption key information to the device;

the device decrypting the job using the encryption key and releasing the job.

10. The computer program product of claim 9, wherein the communication of a job to a device comprises communication of a print job to a printing device;

the user entering to the host user identification information and destination information comprises the user entering to a printer driver user identification information and destination mailbox information;

the destination of the destination information is a destination mailbox; and the device releasing the job comprises printing the print job.

11. The computer program product of claim 9, wherein the authentication server sending the encryption key information to the host comprises the authentication server sending a secrecy encrypting the encryption key to the host;

the host encrypting the job using the encryption key comprises first decrypting the secrecy to obtain the encryption key;

the authentication server sending the encryption key information to the device comprises the authentication server sending a secrecy encrypting the encryption key to the device; and the device decrypting the job using the encryption key comprises first decrypting the secrecy to obtain the encryption key.

12. The computer program product of claim 9, wherein the authentication server sending a secrecy encrypting the encryption key to the host and device comprises the authentication server running a key generator on job, destination, user identification, and user credential information stored in the authentication server to produce the secrecy, and wherein the running of the key generator on job, destination, user identification, and user credential information comprises use of a method selected from the group consisting of SHA1 and MD5 and combinations thereof on job, destination, user identification, and user credential information.

13. The computer program product of claim 12, wherein the decrypting of the secrecy to obtain the encryption key comprises running same key generator as used by the authentication server on job, destination, user identification, and user credential information, and wherein decrypting of the secrecy succeeds only when job, destination, user identification, and user credential information used for decrypting is same as that used by the key generator of the authentication server.

14. The computer program product of claim 9, wherein the user entering user identification information comprises use of a method selected from the group consisting of password, personal identification number, radio frequency identification, retinal scan, fingerprint, biometric identification and combinations thereof, and wherein a timer module of the device checks a timestamp of a job and the job is deleted if the job is older than a threshold time limit value, where the threshold time limit value is optionally shortened if a storage capacity of the device exceeds a threshold capacity limit value.

15. A computing system, comprising:
   memory stored instructions executed by a processor for secure communication of a job to a device, comprising,
   a user entering to a host user identification information and destination information;
   the host sending the job, user, and destination information to an authentication server that contains a database containing all user mailbox ID and password information, wherein the authentication server, the user, and the device reside in a same or different domains;
   the authentication server producing and saving a unique encrypted encryption key associated with the job, user, and destination information into the database;
   the authentication server sending the encrypted encryption key information to the host so that only a user who possesses a correct user information decrypt and fetch an encryption key to proceed with secure mail box print procedure, preventing a malicious user from faking identity to print to the user's mailbox to which the malicious user is not authorized, overflowing the user's mailbox with the malicious user's garbage files;
   the host encrypting the job using the encryption key and sending the encrypted job to a destination of the destination information;
   the user entering to the device user identification information and destination information;
   the device sending the job, user, and destination information to the authentication server;
   the authentication server retrieving the encryption key associated with the job, user, and destination information from the database;
   the authentication server sending the encryption key information to the device;
   the device decrypting the job using the encryption key and releasing the job.

16. The computing system of claim 15, further comprising a print engine, wherein the communication of a job to a device comprises communication of a print job to a printing device;
   the user entering to the host user identification information and destination information comprises the user entering to a printer driver user identification information and destination mailbox information;
   the destination of the destination information is a destination mailbox; and
   the device releasing the job comprises printing the print job.

17. The computing system of claim 15, wherein the authentication server sending the encryption key information to the host comprises the authentication server sending a secrecy encrypting the encryption key to the host;
   the host encrypting the job using the encryption key comprises first decrypting the secrecy to obtain the encryption key;
   the authentication server sending the encryption key information to the device comprises the authentication server sending a secrecy encrypting the encryption key to the device; and
   the device decrypting the job using the encryption key comprises first decrypting the secrecy to obtain the encryption key.

18. The computing system of claim 15, wherein the authentication server sending a secrecy encrypting the encryption key to the host and device comprises the authentication server running a key generator on job, destination, user identification, and user credential information stored in the authentication server to produce the secrecy, and wherein the running of the key generator on job, destination, user identification, and consisting of SHA1 and MD5 and combinations thereof on job, destination, user identification, and user credential information.

19. The computing system of claim 18, wherein the decrypting of the secrecy to obtain the encryption key comprises running same key generator as used by the authentication server on job, destination, user identification, and user credential information, and wherein decrypting of the secrecy succeeds only when job, destination, user identification, and user credential information used for decrypting is same as that used by the key generator of the authentication server.

20. The computing system of claim 15, wherein the user entering user identification information comprises use of a method selected from the group consisting of password, personal identification number, radio frequency identification, retinal scan, fingerprint, biometric identification and combinations thereof, and wherein a timer module of the device checks a timestamp of a job and the job is deleted if the job is older than a threshold time limit value, where the threshold time limit value is optionally shortened if a storage capacity of the device exceeds a threshold capacity limit value.

* * * * *